(12) United States Patent
Khawand et al.

(10) Patent No.: US 10,440,652 B2
(45) Date of Patent: *Oct. 8, 2019

(54) POWER MANAGEMENT OF A MOBILE COMMUNICATIONS DEVICE

(71) Applicant: Microsoft Technology Licensing, LLC, Redmond, WA (US)

(72) Inventors: Charbel Khawand, Sammamish, WA (US); Scott A. Fudally, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,816

(22) Filed: Jul. 10, 2017

(65) Prior Publication Data

US 2017/0318539 A1 Nov. 2, 2017

Related U.S. Application Data

(63) Continuation of application No. 14/711,633, filed on May 13, 2015, now Pat. No. 9,713,092, which is a
(Continued)

(51) Int. Cl.
*H04W 52/02* (2009.01)
*G06F 1/3203* (2019.01)
(Continued)

(52) U.S. Cl.
CPC ...... *H04W 52/0261* (2013.01); *G06F 1/3203* (2013.01); *G06F 11/3013* (2013.01);
(Continued)

(58) Field of Classification Search
CPC ............ H04W 52/02; H04W 52/0225; H04W 52/0261; H04W 52/0264; H04W 52/0267;
(Continued)

(56) References Cited

U.S. PATENT DOCUMENTS 5,333,176 A 7/1994 Burke et al.
6,286,104 B1 9/2001 Buhle et al.
(Continued)

FOREIGN PATENT DOCUMENTS

WO WO-2007024968 5/2007

OTHER PUBLICATIONS

"Approaches to Reduce Energy Consumption of WLAN Devices", Retrieved from http://user.informatik.uni-goettingen.de/~fu/teaching/Seminar/SS2004/essay/johny.pdf on Aug. 3, 2009., Sep. 14, 2004, 14 pages.
(Continued)

*Primary Examiner* — Magdi Elhag
(74) *Attorney, Agent, or Firm* — Newport IP, LLC; Mike R. Cicero

(57) ABSTRACT

A user interface for power management of a mobile communications device is described. In an implementation, power consumption used in performance of a plurality of tasks is monitored by a mobile communications device. A determination is made as to an amount of power that remains in a battery of the mobile communications device. A user interface is displayed on a display device of the mobile communications device that describes an amount of time each of the plurality of tasks may be performed based on the determined amount of power that remains in the battery.

19 Claims, 6 Drawing Sheets

Related U.S. Application Data continuation of application No. 12/564,745, filed on Sep. 22, 2009, now Pat. No. 9,047,084.

(51) Int. Cl.
*G06F 11/30* (2006.01)
*H04M 1/725* (2006.01)
*H04W 24/10* (2009.01)

(52) U.S. Cl.
CPC ..... *G06F 11/3062* (2013.01); *H04M 1/72519* (2013.01); *H04W 24/10* (2013.01); *Y02D 70/00* (2018.01); *Y02D 70/142* (2018.01); *Y02D 70/144* (2018.01); *Y02D 70/164* (2018.01)

(58) Field of Classification Search
CPC ........... H04W 52/0287; H04W 52/027; H04W 52/0277; H04W 52/0283; H04W 52/0216; H04W 52/0209; H04W 52/0251; H04W 52/0274; Y02B 60/10; Y02B 60/12; Y02B 60/14; Y02B 60/18; Y02B 60/185; Y02B 60/186; Y02B 60/188; G06F 1/3203; G06F 11/3013; G06F 11/3062; G06F 1/324; G06F 1/3206; G06F 1/3228; G06F 1/3234; G06F 1/32; G06F 1/3265; G06F 1/3212; G06F 1/3218; G06F 1/325
See application file for complete search history.

(56) References Cited

U.S. PATENT DOCUMENTS

| | | |
|---|---|---|
| 6,445,937 B1 | 9/2002 | daSilva |
| 6,463,305 B1 | 10/2002 | Crane |
| 6,810,338 B2 | 10/2004 | Mercke |
| 7,079,873 B2 | 7/2006 | Fan et al. |
| 7,356,594 B2 | 4/2008 | Khawand |
| 7,528,577 B2 | 5/2009 | Hara et al. |
| 7,583,984 B2 | 9/2009 | Sun et al. |
| 7,917,179 B2 | 3/2011 | Kokubo |
| 8,032,150 B2 | 10/2011 | Cole |
| 8,228,234 B2 | 7/2012 | Paulson et al. |
| 8,862,910 B2 | 10/2014 | Sato |
| 9,047,084 B2 | 6/2015 | Khawand et al. |
| 9,713,092 B2 | 7/2017 | Khawand et al. |
| 2002/0016189 A1 | 2/2002 | Sheynblat et al. |
| 2003/0195719 A1 | 10/2003 | Emori et al. |
| 2004/0102228 A1 | 5/2004 | Hakamata et al. |
| 2004/0185918 A1 | 9/2004 | Fan et al. |
| 2004/0203363 A1 | 10/2004 | Carlton et al. |
| 2004/0204174 A1 | 10/2004 | Pehrsson |
| 2004/0204183 A1 | 10/2004 | Lencevicius |
| 2005/0046390 A1 | 3/2005 | Kimura |
| 2006/0068852 A1 | 3/2006 | Doyle |
| 2007/0004466 A1 | 1/2007 | Haartsen |
| 2007/0188144 A1 | 8/2007 | Hara et al. |
| 2007/0298847 A1 | 12/2007 | Karaoguz et al. |
| 2008/0007222 A1 | 1/2008 | Nance |
| 2008/0057894 A1 | 3/2008 | Aleksic et al. |
| 2008/0113693 A1 | 5/2008 | Yoo |
| 2008/0192666 A1 | 8/2008 | Koskan |
| 2008/0200220 A1 | 8/2008 | Jackson |
| 2008/0253351 A1 | 10/2008 | Pernu et al. |
| 2008/0261662 A1 | 10/2008 | Ashbrook et al. |
| 2008/0305839 A1 | 12/2008 | Karaoguz et al. |
| 2008/0318580 A1* | 12/2008 | Zhong ............... H04W 52/0229 455/444 |
| 2009/0005126 A1 | 1/2009 | Wang et al. |
| 2009/0170596 A1* | 7/2009 | Gagner .................. G07F 17/32 463/25 |
| 2009/0191926 A1 | 7/2009 | Doyle |
| 2009/0270138 A1 | 10/2009 | Raveendran |
| 2010/0003950 A1 | 1/2010 | Ray et al. |
| 2010/0042856 A1 | 2/2010 | Tsai et al. |
| 2010/0048139 A1 | 2/2010 | Seo et al. |
| 2010/0120477 A1 | 5/2010 | Imai |
| 2010/0145643 A1 | 6/2010 | Katpelly et al. |
| 2011/0072292 A1 | 3/2011 | Khawand |
| 2016/0007296 A1 | 1/2016 | Khawand et al. |

OTHER PUBLICATIONS

"Battery Monitor 2.0", Retrieved from http://www.pdawin.com/BatteryMonitor.html on Aug. 3, 2009., 2 pages.
"Corrected Notice of Allowance", U.S. Appl. No. 14/711,633, dated Apr. 24, 2017, 12 pages.
"Final Office Action", U.S. Appl. No. 12/564,745, dated Apr. 30, 2014, 22 pages.
"Final Office Action", U.S. Appl. No. 12/564,745, dated Sep. 13, 2012, 16 pages.
"Final Office Action", U.S. Appl. No. 14/711,633, dated Oct. 11, 2016, 28 pages.
"Mobile Platforms Need Power-Conserving Applications: Optimizing Applications for Extended Battery Life", Retrieved from http://www.developers.net/intelisnshowcase/view/1240 on Aug. 3, 2009., 3 pages.
"Non-Final Office Action", U.S. Appl. No. 12/564,745, dated Sep. 24, 2014, 24 pages.
"Non-Final Office Action", U.S. Appl. No. 12/564,745, dated Nov. 6, 2013, 23 pages.
"Non-Final Office Action", U.S. Appl. No. 12/564,745, dated Feb. 17, 2012, 22 pages.
"Non-Final Office Action", U.S. Appl. No. 14/711,633, dated Apr. 15, 2016, 17 pages.
"Notice of Allowance", U.S. Appl. No. 12/564,745, dated Jan. 28, 2015, 10 pages.
"Notice of Allowance", U.S. Appl. No. 14/711,633, dated Mar. 13, 2017, 9 pages.
"Power Mode—Windows Mobile Battery Monitor", Retrieved from http://www.smartdevicefreeware.com/power-mode-windows-mobile-battery-monitor/ on Aug. 3, 2009., 4 pages.
"Supplemental Notice of Allowance", U.S. Appl. No. 12/564,745, dated Mar. 20, 2015, 4 pages.

* cited by examiner

10,440,652 B2

POWER MANAGEMENT OF A MOBILE COMMUNICATIONS DEVICE

PRIORITY APPLICATION

This application claims priority under 35 U.S.C. § 120 to U.S. patent application Ser. No. 14/711,633, filed May 13, 2015, and titled "Power Management of a Mobile Communications Device," and application Ser. No. 12/564,745, filed Sep. 22, 2009, and titled "Power Management of a Mobile Communications Device," the disclosure of which is being incorporated by reference in its entirety.

BACKGROUND

Mobile communication devices (e.g., wireless phones) have become an integral part of everyday life. However, the form factor and functionality employed by conventional mobile communications devices is typically limited to promote mobility of the device.

For example, mobile communications devices are powered by batteries that are typically sized to promote mobility of the mobile communications device. Even if the mobile communications device has a relatively large battery, however, the amount of power that may be obtained from the battery is finite. Accordingly, conventional mobile communications devices include an output that indicates an amount of power that is available from the battery, e.g., 40%. However, this indication is typically the sole indication provided to a user of the mobile communications device, which may make it difficult for the user to judge the remaining usefulness of the mobile communications device based on the current amount of power available from the battery.

SUMMARY

A user interface for power management of a mobile communications device is described. In an implementation, power consumption used in performance of a plurality of tasks is monitored by a mobile communications device. A determination is made as to an amount of power that remains in a battery of the mobile communications device. A user interface is displayed on a display device of the mobile communications device that describes an amount of time each of the plurality of tasks may be performed based on the determined amount of power that remains in the battery.

In an implementation, one or more computer-readable storage media comprise instructions that are executable by a mobile communications device to provide an operating system that is executable to monitor battery usage of the mobile communications device to perform one or more tasks and expose data generated from the monitored usage via an application programming interface (API) to one or more applications that are executable on the mobile communications device to adjust power consumption by the one or more applications.

In an implementation, a mobile communications device includes a battery, a processor, and memory configured to maintain instructions that are executable on the processor to monitor an amount of power that remains in the battery and if the amount of power drops below a threshold level that is set to enable a telephone call, restrict telephone calls from being performed that are directed at a non-emergency telephone number.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Mobile communications devices typically have a small form factor to aide mobility of the mobile communications device. For example, the mobile communications device (e.g., a mobile phone) may be configured with a relatively minimal amount of display area and limited input devices (e.g., a keypad) so that the device may be easily transported. Additionally, the mobile communications device may have a limited amount of power available to perform tasks due to use of a battery. However, conventional techniques that were used to inform a user as to a current state of the battery had limited functionality. For example, by simply displaying an amount of power that remains in the battery using a percentage forced the user to roughly determine what that meant.

Power management techniques are described for use by a mobile communications device or other device with a battery. In an implementation, a user interface is output that describes a plurality of tasks that are performable by the mobile communications device. The user interface also describes an amount of time that may be used to perform the tasks based on an amount of power that is currently available from a battery of the mobile communications device. For example, the user interface may display an amount of time each application may be executed on the mobile communications device. Further, as applications are booted, the result of this action (e.g., execution of each additional application)

may be reflected in the user interface. In this way, a user may make an informed decision as to which tasks may be performed based on a current state of the battery, further discussion of which may be found in relation to FIG. 3. A variety of other implementations are also described in the following sections, including implementations to enable applications to conserve power as further discussed in relation to FIG. 4, implementations to restrict functionality to extend an ability to make emergency telephone calls as further discussed in relation to FIG. 5, and so on.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, netbooks, and so on.

Example Implementations

Figure 1:
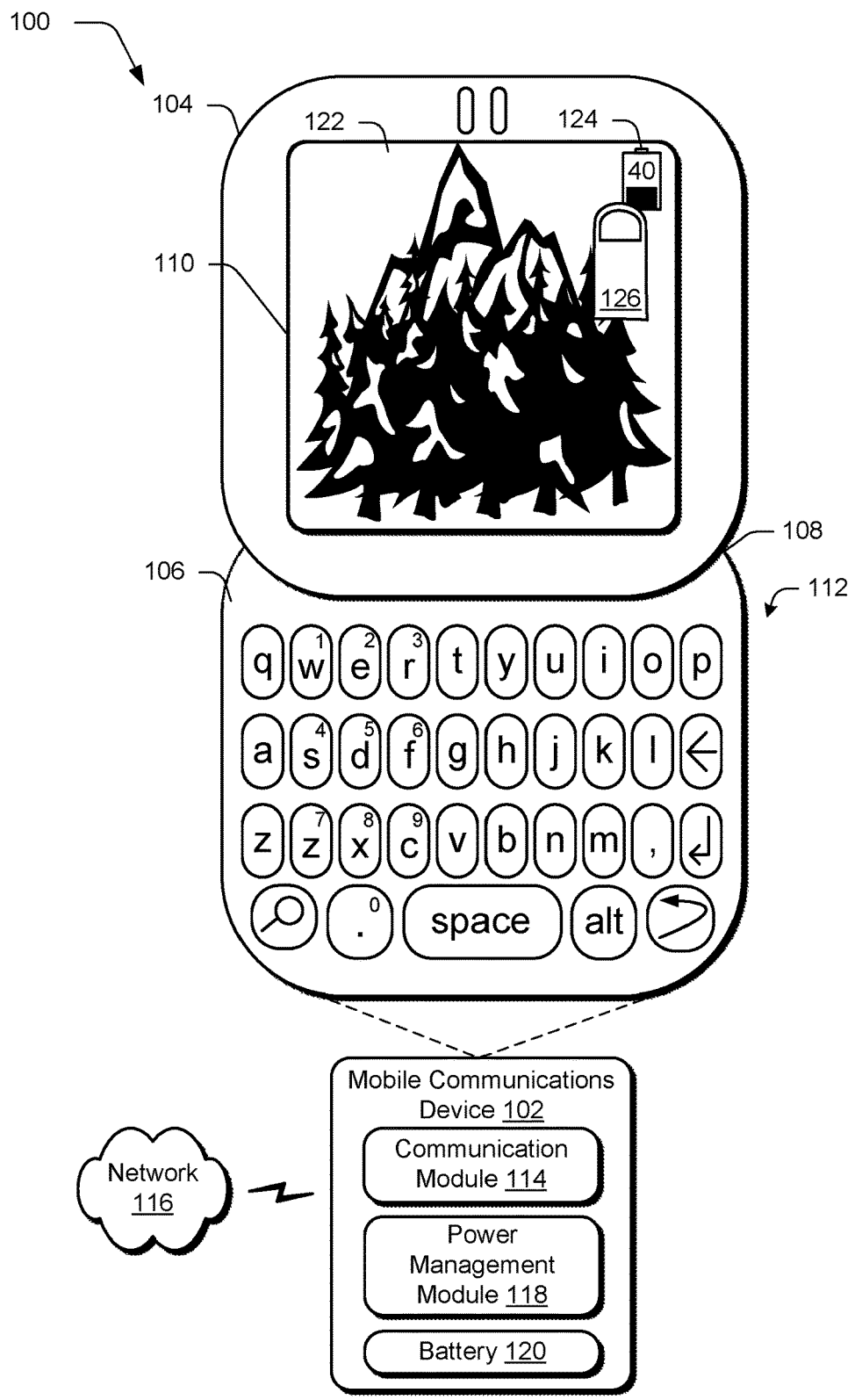
FIG. 1 is an illustration of an example implementation of a mobile communications device in accordance with one or more embodiments of devices, features, and systems for mobile communications.
Figure 2:
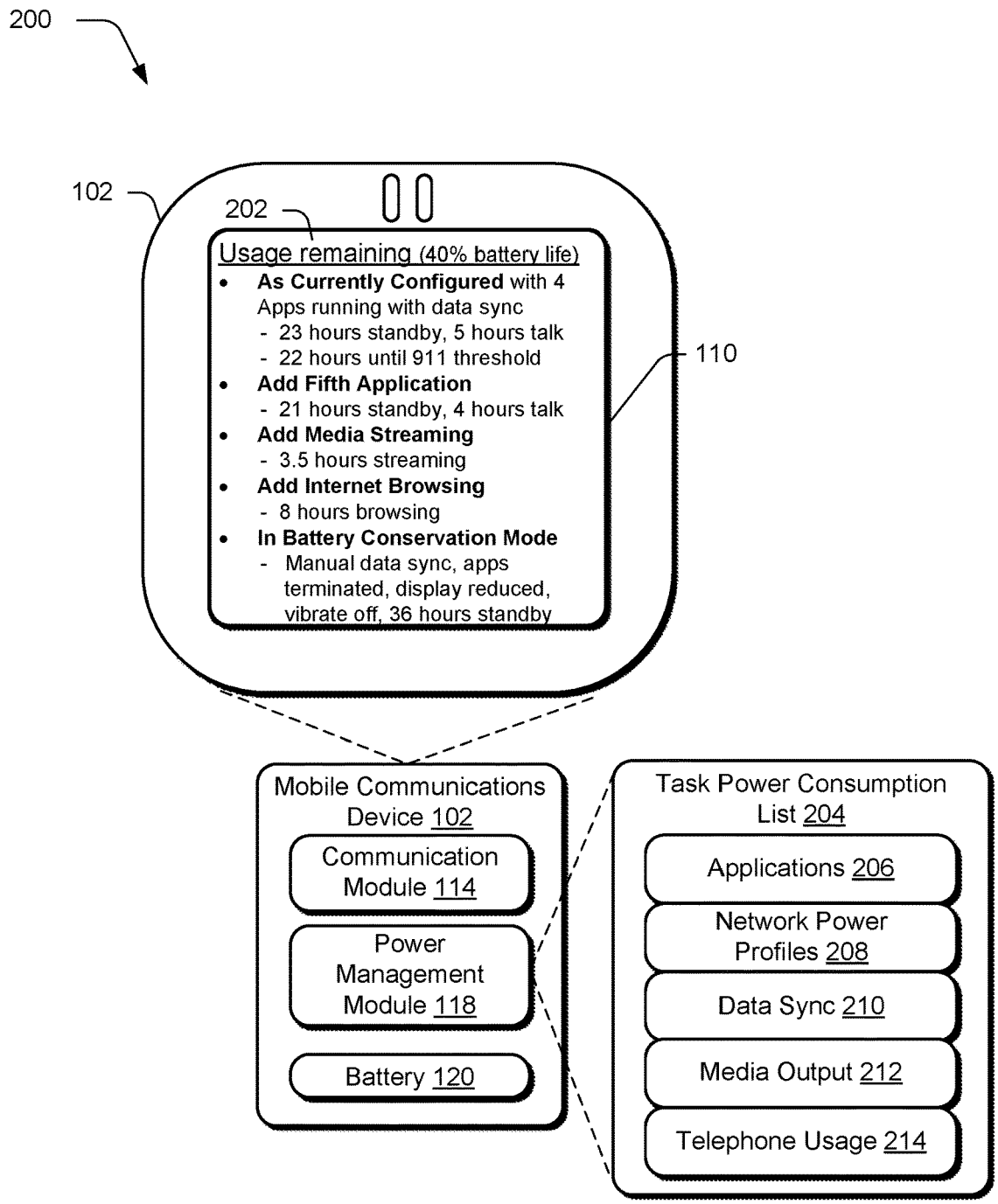
FIG. 2 illustrates an example system showing a mobile communications device of FIG. 1 as displaying a user interface a configured to assist a user to manage power consumption of the device.

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration as illustrated in FIG. 1 in which the mobile communications device 102 is "open" and a configuration in which the mobile communications device 102 is "closed" as illustrated in FIG. 2.

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of content, such as a caller identification (ID), contacts, images (e.g., photos) as illustrated, email, multimedia messages, Internet browsing, game play, music, video, and so on. In an implementation, the display device 110 is configured to function as an input device by incorporating touchscreen functionality, e.g., through capacitive, surface acoustic wave, resistive, optical, strain gauge, dispersive signals, acoustic pulse, and other touchscreen functionality. The touchscreen functionality (as well as other functionality such as track pads) may also be used to detect gestures as further described below.

The second housing 106 is illustrated as including a keyboard 112 that may also be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

The form factor employed by the mobile communications device 102 may be suitable to support a wide variety of features. For example, the keyboard 112 is illustrated as supporting a QWERTY configuration. This form factor may be convenient to a user to utilize the previously described functionality of the mobile communications device 102, such as to compose texts, play games, check email, "surf" the Internet, provide status messages for a social network, and so on.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to capture content, form short message service (SMS) text messages, multimedia messaging service (MMS) messages, emails, status updates to be communicated to a social network service, and so on. A user, for instance, may input a status update for communication via the network 116 to the social network service. The social network service may then publish the status update to "friends" of the user, e.g., for receipt by the friends via a computer, respective mobile communications devices, and so on. A variety of other examples are also contemplated, such as blogging, instant messaging, and so on.

The mobile communications device 102 is also illustrated as including a power management module 118 that is representative of functionality of the mobile communications device 102 to manage and assist in management of power consumption of a battery 120. For example, the display device 110 is illustrated as outputting a user interface 122 that includes a representation 124 of a current power level of the battery 120, e.g., 40 percent. Selection of the representation 124 by a user's finger 126 or other implement causes the power management module 118 to output a user interface configured to manage power consumption of the mobile communications device 102, further discussion of which may be found in relation to the following figure.

FIG. 2 illustrates an example system 200 showing the mobile communications device 102 of FIG. 1 as displaying a user interface 202 configured to assist a user to manage power consumption of the device. A variety of different information may be displayed in the user interface 202 to assist the user that is expressed in terms that are readily understandable by the user.

For example, the power management module 118 may incorporate functionality to monitor use of the battery 120 to perform a variety of different tasks. This monitored usage may then be used to store data that describes the tasks and the amount of power consumed to perform the tasks, which is illustrated as a task power consumption list 204 in this example. A variety of different tasks may be monitored and described, such as applications 206, network power profiles 208, data sync 210, media output 212, telephone usage 214, and so on.

For example, the applications 206 may describe power used during execution of the application as a whole, such as an amount of power typically consumed over a period of time. The applications 206 may also describe specific tasks performed through execution of the applications 206, such as to access a network, render video, emulate hardware functionality typically found on a full-feature computing device (e.g., 3D acceleration), and so on. Thus, the applications 206 may describe how a user typically interacts with the application and thus be used to give an accurate assessment of this usage.

The network power profiles 208 may be used to describe usage of different wireless networks. For example, the communication module 114 may include functionality to communicate over a mobile phone network (e.g., as a wireless phone, access point, or so on) as well as over a local wireless network, such as IEEE 802.11, WiFi, Bluetooth, and so on. Because usage of these different networks may consume different amounts of power, the power management module 118 may track the performance of tasks in relation to the different networks to aid in management of the battery 120.

Data sync 210 describes an amount of power used to perform data synchronization. For example, an operating system of the mobile communications device 102 may provide a utility to synchronize data such email, contacts, to send and text messages, appointments, and so on. Accordingly, the power management module 118 may track an amount of power used to perform these various synchronization tasks as well as a frequency at which these tasks are typically performed.

The power management module 118 may also monitor media output 212, such an amount of power used to obtain and render streaming media, play songs or movies, games, and so on. Telephone usage 214 may also be monitored by the power management module 118, such as an amount of power used in a typical phone call placed by a user of the mobile communications device 102. Although a few examples have been listed of tasks that may be monitored by the power management module 118, it should be readily apparent that a wide variety of other tasks are also contemplated without departing from the spirit and scope thereof, such as to monitor the battery 120 itself for decreasing amounts of power as time goes on, such as due to a "memory effect" of the battery 120.

Additionally, although monitoring by the power management module 118 has been described, it should be apparent that an amount of power used to perform tasks may be determined in a variety of ways. For example, the power management module 118 may output a user interface via which a user may pre-enter statistics that describe power consumption, e.g., per minute for a phone call, browser application, and so on. In another example, the power management module 118 may receive these statistics from an outside source, e.g., downloaded via the network 116. In a further example, these statistics may be entered by a manufacturer or supplier of the mobile communications device 102.

The power management module 118 may then leverage the monitored usage described by the task power consumption list 204 in a variety of ways to aid power management of the mobile communications device 102. One such example is illustrated in FIG. 2 by the user interface 202. As previously described the user interface 202 was output in response to selection of the representation 124 of the current power level of the battery 120 in FIG. 1. It should be readily apparent, however, that the user interface 202 may be output in response to a wide variety of criteria, such as when the amount of power available from the battery 120 drops below a threshold.

The user interface 202 as displayed in FIG. 2 is configured to inform and therefore aid a user as to which actions may be performed to manage power consumption and the effect of those actions. In one illustrated example, the user interface 202 describes an amount of time the mobile communication device 102 may continue to function as currently configured. For example, this amount of time may be based on which applications are currently being executed by the device as well as other tasks are currently configured to execute, such as data synchronization.

The user interface 202 also shows a possible effect of adding additional tasks to be performed by the mobile communications device 102. For example, the user interface 202 shows the effect of adding another application (a fifth application to the other four currently executing applications) to an amount of standby time and talk time. The user interface 202 also shows that media streaming may be performed for 3.5 hours and internet browsing may be performed for 8 hours based on an amount of power that is currently available from the battery 120. Therefore, the user interface 202 illustrates a result of an action of selecting performance of these additional tasks and informs the user in a readily understood manner how.

The user interface 202 also displays an option that is selectable to initiate a battery conservation mode. In the illustrated example, the battery conservation mode promotes conservation by terminating applications, setting data synchronization to manual, reducing brightness of the display, and turning vibrate off. Additionally, the user interface 202 shows an effect of this mode in which the standby time of the mobile communications device 102 is increased. Thus, in the example of FIG. 2 the user interface 202 may be used to increase or decrease "battery life" of the battery 120 based on the desires of the user. A variety of other examples are also contemplated, further discussion of which may be found in relation to the following procedures.

Example Procedures

The following discussion describes power management techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and systems 200 of FIGS. 1 and 2, respectively.

Figure 3:
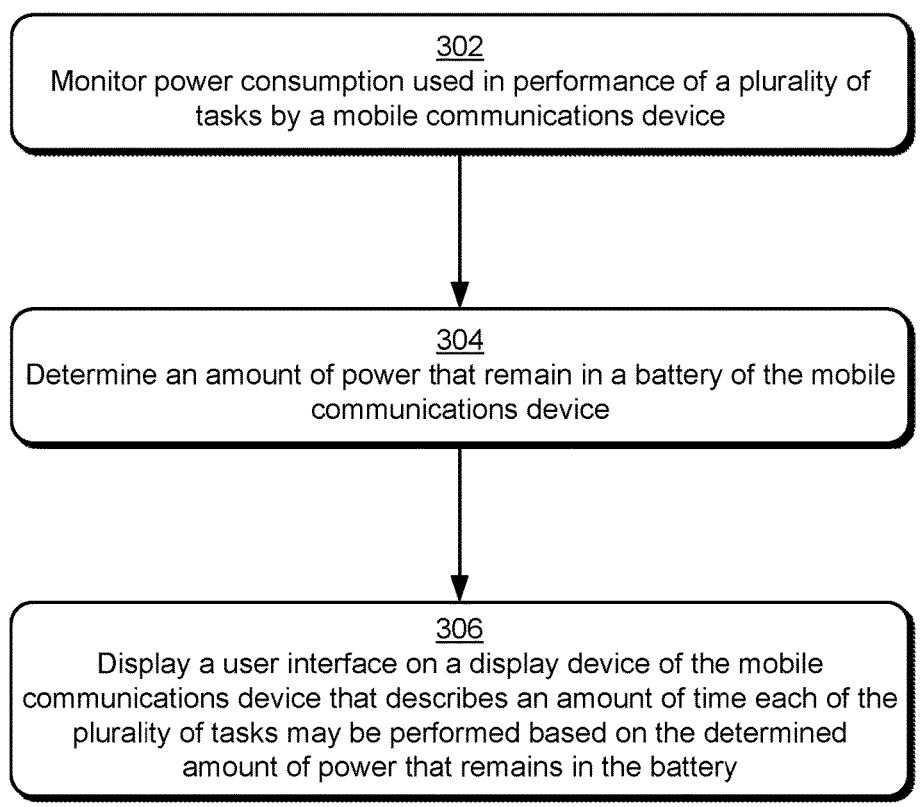
FIG. 3 is a flow diagram depicting a procedure in an example implementation in which a user interface is output that describes an amount of time that is available to perform one or more tasks based on monitored usage of a mobile communications device.

FIG. 3 depicts a procedure 300 in an example implementation in which a user interface is output that describes an amount of time that is available to perform one or more tasks based on monitored usage of a mobile communications device. Power consumption is monitored that is used in performance of a plurality of tasks by a mobile communications device (block 302). For example, the power management module 118 of FIG. 2 may monitor tasks that are performed by the device and store data that describes this monitoring as a task power consumption list 204. As previously described, a variety of tasks may be described, such as execution of one or more applications, use of different wireless networks, data synchronization, rendering of media, usage of telephone functionality of the mobile communications device 102 by a user, and so on.

A determination is made as to an amount of power that remains in a battery of the mobile communications device (block 304). Continuing with the previous example, the power management module 118 may also monitor usage of the battery 120. In an implementation, this monitoring may take into account a decreased ability of the battery 120 to store power over time, such as due to a "memory effect."

A user interface is displayed on a display device of the mobile communications device that describes an amount of time each of a plurality of tasks may be performed based on the determined amount of power that remains in the battery (block 306). As shown in the user interface 202 of FIG. 2, for example, the plurality of tasks may be described along with the effect of performance of the task on the amount of power that is available from the battery 120. This may be expressed in a variety of ways, such as by displaying an amount of time the task may be performed, an amount of time a mobile communications device 102 remains operational, and so on. For example, the user interface may describe an amount of time that a Web browser may be used to browse the Internet. In another example, the user interface describes an amount of time that media may be rendered, such as music, video, games, and so on. In a further example, the user interface describes a number of times a task may be performed, e.g., data synchronization. In an implementation, the steps may be repeated at predetermined intervals of time to update the user interface as the amount of power in the battery 120 decreases or increases, e.g., due to charging.

Although this example described output of the user interface to aid a user in managing power consumption of the mobile communications device, a variety of other functionality may also be employed that does not involve user intervention. Further discussion of power management functionality that may be performed automatically and without user intervention may be found in relation to the following figures.

Figure 4:
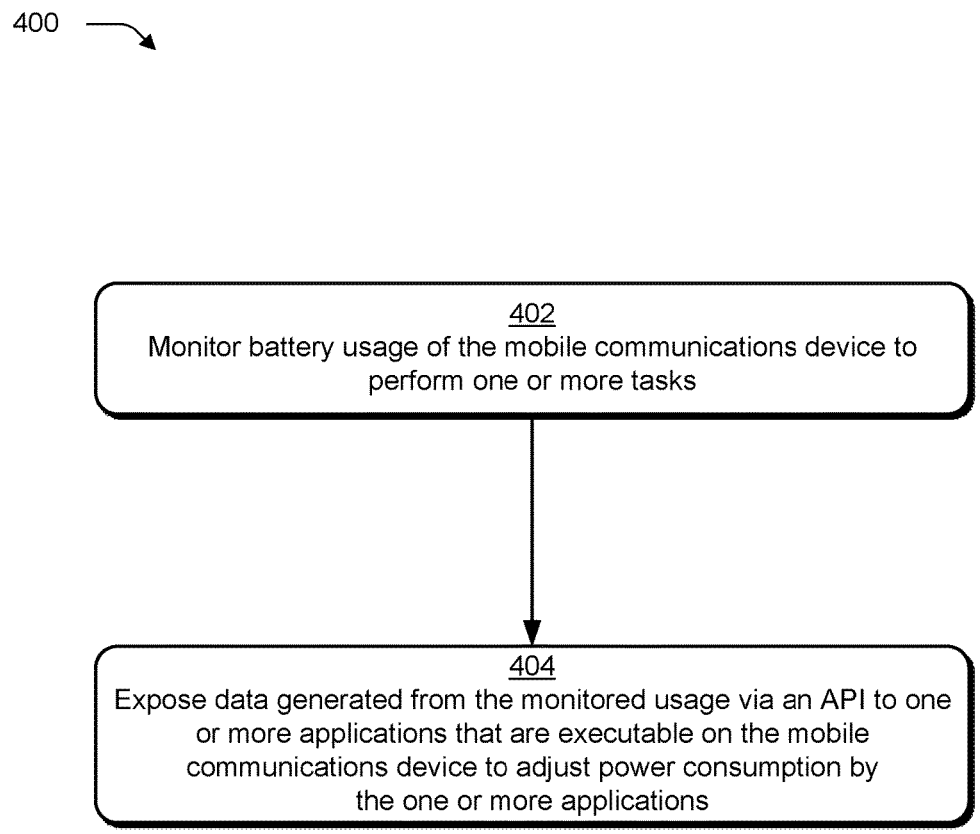
FIG. 4 is a flow diagram depicting a procedure in an example implementation in which data that describes monitored battery usage is exposed via an application programming interface (API) to one or more applications.

FIG. 4 depicts a procedure 400 in an example implementation in which data that describes monitored battery usage is exposed via an application programming interface (API) to one or more applications. Battery usage is monitored of the mobile communications device to perform one or more tasks (block 402). Data generated from the monitored usage is exposed via an application programming interface (API) to one or more applications that are executable on the mobile communications device to adjust power consumption by the one or more applications (block 404).

For example, the power management module 118 to be part of an operating system that exposes an application programming interface to one or more other applications that executable on the mobile communications device 102. Data exposed via the API may be used by the application to address performance of one or more tasks by the application.

For example, the mobile communications device 102 may be configured such that 3-D acceleration functionality is not included. Therefore, the application may be configured to emulate this functionality on a processor of the mobile communications device 102, which may consume a significant amount of power. Consequently, if the application detects that the amount of power that is available from the battery 120 is decreased below a certain threshold, the application may restrict this emulation from being performed to conserve power of the battery 120. In this way, the application may change how hardware resources of the mobile communications device 102 are used to perform tasks and may do so automatically and without user intervention.

A variety of other thresholds may also be employed by the power management module 118. In an implementation, a plurality of threshold levels are set (e.g., by a user, a manufacturer, and so on) in terms of a combinatory list of tasks (e.g., execution of applications) that are allowed to be performed at different power levels of the battery 120. Therefore, when the power management module 118 determines that a particular power level of the battery 120 has been achieved, for instance, the power management module 118 may query the list to determine which tasks the mobile communications device 102 is permitted to perform, either simultaneously or individually. In this way, the mobile communications device 102 may use the list to determine a priority of tasks for various power levels of the battery 120.

A variety of other examples are also contemplated, such as by reducing a frequency at which tasks are performed (e.g., data synchronization), a frame rate used to display content, and so on. For instance, the power management module 118 may communicate data that causes the application to terminate execution on the mobile communications device 102.

Figure 5:
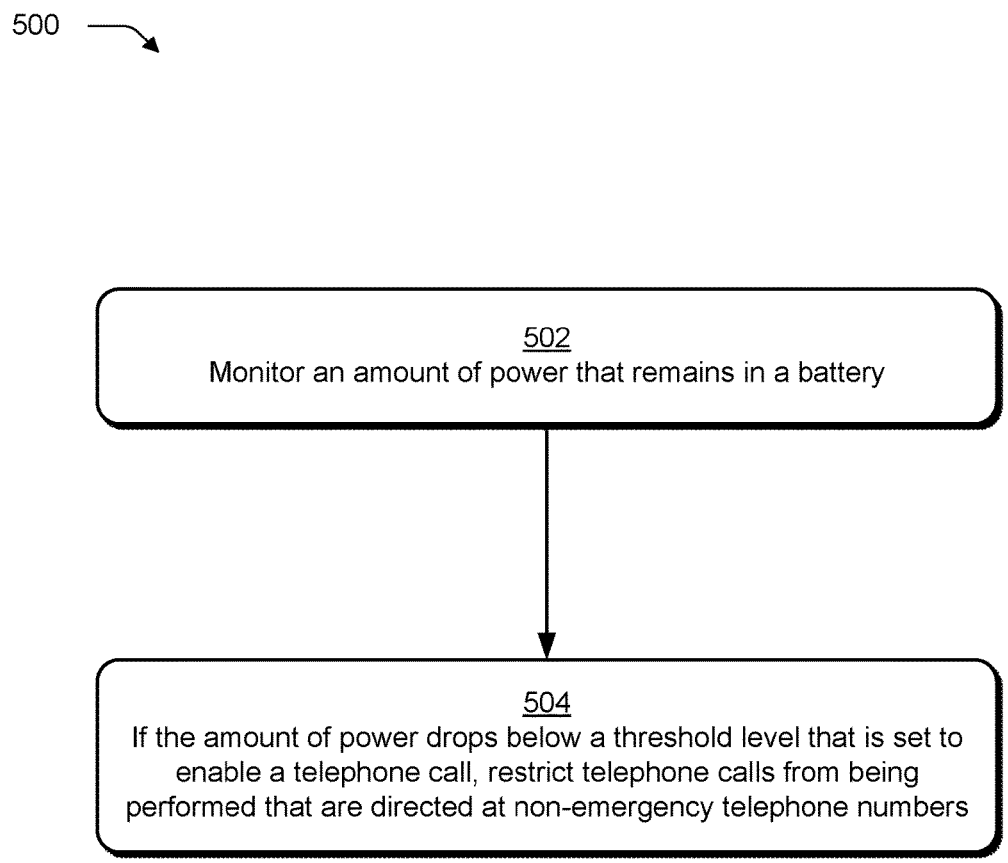
FIG. 5 is a flow diagram depicting a procedure in an example implementation in which power in a battery is conserved to enable emergency telephone calls.

FIG. 5 depicts a procedure 500 in an example implementation in which power in a battery is conserved to enable emergency telephone calls. In the previous example, the power management module 118 provided information to applications to perform power management, which may be done automatically and without user intervention. This power management may also be performed by the power management module 118 to prevent certain tasks from being performed based on power consumption that would prevent emergency features, such as telephone calls to emergency telephone numbers, global positioning system (GPS) functionality, and so on as further described below.

An amount of power that remains in a battery is monitored (block 502). If the amount of power drops below a threshold level that is set to enable a telephone call, telephone calls are restricted from being performed that are directed at non-emergency telephone numbers (block 504). For example, the threshold level may be set to enable a plurality of telephone calls of a specific duration. Therefore, if the power drops below this level, the power management module 118 may restrict features from being performed that are related to non-emergency tasks, such as data synchronization, media rendering (e.g., playing music), and so on. For example, the power management module 118 may use a list (e.g., that may be user specified) that indicates a priority for each task to determine whether to interrupt a current activity based on the priority. In this way, the power management module 118 may interrupt a current task (e.g., terminate execution of an application) based on user priority.

Example Device

Figure 6:
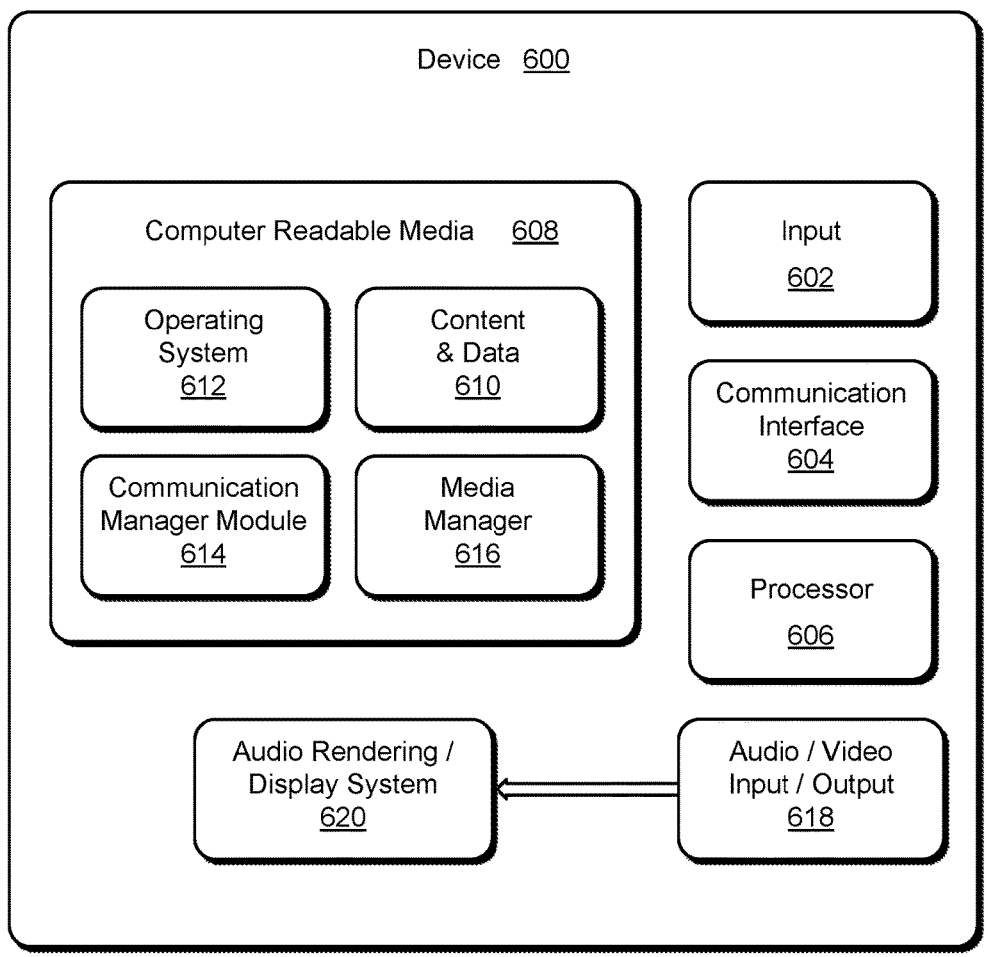
FIG. 6 illustrates various components of an example device that can be implemented in various embodiments as any type of a mobile device to implement embodiments of devices, features, and systems for mobile communications.

FIG. 6 illustrates various components of an example device 600 that can be implemented in various embodiments as any type of a mobile device to implement embodiments of devices, features, and systems for mobile communications. For example, device 600 can be implemented as any of the mobile communications devices 102 described with reference to respective FIGS. 1-2. Device 600 can also be implemented to access a network-based service.

Device 600 includes input 602 that may include Internet Protocol (IP) inputs as well as other input devices, such as the keyboard 112 of FIG. 1. Device 600 further includes communication interface 604 that can be implemented as any one or more of a wireless interface, any type of network interface, and as any other type of communication interface. A network interface provides a connection between device 600 and a communication network by which other electronic and computing devices can communicate data with device 600. A wireless interface enables device 600 to operate as a mobile device for wireless communications.

Device 600 also includes one or more processors 606 (e.g., any of microprocessors, controllers, and the like) which process various computer-executable instructions to control the operation of device 600 and to communicate with other electronic devices. Device 600 can be implemented with computer-readable media 608, such as one or more memory components, examples of which include random access memory (RAM) and non-volatile memory (e.g., any one or more of a read-only memory (ROM), flash memory, EPROM, EEPROM, etc.).

Computer-readable media 608 provides data storage to store content and data 610, as well as device applications and any other types of information and/or data related to operational aspects of device 600. For example, an operating system 612 can be maintained as a computer application with the computer-readable media 608 and executed on processor 606. Device applications can also include a communication manager module 614 (which may be used to provide telephonic functionality) and a media manager 616.

Device 600 also includes an audio and/or video output 618 that provides audio and/or video data to an audio rendering and/or display system 620. The audio rendering and/or display system 620 can be implemented as integrated component(s) of the example device 600, and can include any components that process, display, and/or otherwise render audio, video, and image data. Device 600 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a mobile communications device, the method comprising:
monitoring a current rate of power consumption that is being used by the mobile communications device to perform a plurality of tasks that correspond to a current configuration of the mobile communications device;
determining a current battery level of the mobile communications device;
determining, based on the current battery level of the mobile communications device:
a first amount of time that the mobile communications device can continue to operate in the current configuration by continuing to perform the plurality of tasks, and
a second amount of time that the mobile communications device can continue to operate in a potential configuration by continuing to perform the plurality of tasks in additional to at least one other task; and
causing, while operating in the current configuration, a display device of the mobile communications device to render a user interface that describes at least:
the first amount of time that the mobile communications device can continue to operate in the current configuration, and
the second amount of time that the mobile communications device could continue to operate in the potential configuration.

2. A method as described in claim 1, wherein the plurality of tasks is associated with one or more of network power profiles, data syncs, media outputs, or telephone usage.

3. A method as described in claim 2, wherein the network power profiles describe power consumption with respect to usage of different types of wireless networks.

4. A method as described in claim 2, wherein the data syncs describe an amount of power required to perform data synchronization tasks.

5. A method as described in claim 2, wherein the media outputs describe an amount of power required to perform one or more of obtaining or rendering streaming media, playing songs or movies, or playing games.

6. A method as described in claim 2, wherein the telephone usage describes an amount of power consumed in a phone call placed by a user of the mobile communications device.

7. A method as described in claim 1, wherein the plurality of tasks comprise one or more of accessing a network, rendering video, or emulating hardware functionality.

8. A method as described in claim 1, wherein causing the display device to render the user interface is responsive to the current battery level of the mobile communications device being below a threshold.

9. A method as described in claim 1, wherein the user interface further describes an amount of time that the mobile communications device may continue to function if one or more currently running tasks are removed from the current configuration of the mobile communications device.

10. A method as described in claim 1, further comprising:
determining, based on the current battery level of the mobile communications device, a third amount of time that the mobile communications device can continue to operate in another potential configuration by removing at least one task from the current configuration, wherein the user interface further describes the third amount of time.

11. A mobile communications device comprising:
one or more processors;
a battery;
a display device; and
one or more computer readable storage memories having instructions stored thereon that, upon execution by the one or more processors, cause the mobile communications device to perform operations comprising:
monitoring a current rate of power consumption that is being used by the mobile communications device to perform a plurality of tasks that correspond to a current configuration of the mobile communications device;
determining a current battery level of the mobile communications device;
determining, based on the current battery level of the mobile communications device:
a first amount of time that the mobile communications device can continue to operate in the current configuration by continuing to perform the plurality of tasks that correspond to the current configuration of the mobile communications device and
a second amount of time that the mobile communications device can continue to operate in a at least one potential configuration that is different than the current configuration; and while operating in the current configuration, causing the display device to render a user interface that describes at least:

the first amount of time that the mobile communications device can continue to operate in the current configuration, and the second amount of time that the mobile communications device could continue to operate in the at least one potential configuration.

12. A mobile communications device as described in claim 11, wherein the determining the first amount of time that the mobile communications device can continue to operate in the current configuration and the second amount of time that the mobile communications device can continue to operate in the at least one potential configuration takes into account a decreased ability of the battery to store power over time.

13. A mobile communications device as described in claim 11, wherein the plurality of tasks comprises specific tasks performed through the execution of the at least two different applications.

14. A mobile communications device as described in claim 13, wherein the specific tasks comprise one or more of accessing a network, rendering video, or emulating hardware functionality.

15. A mobile communications device as described in claim 11, wherein displaying the user interface on the display device of the mobile communications device is responsive to the current battery level being below a threshold.

16. A mobile communications device as described in claim 11, wherein the plurality of tasks comprises one or more of network power profiles, data syncs, media outputs, or telephone usage.

17. A mobile communications device as described in claim 11, wherein the at least one potential configuration corresponds to the mobile communications device continuing to perform the plurality of tasks in additional to at least one other task.

18. A mobile communications device as described in claim 11, wherein the at least one potential configuration corresponds to the mobile communications device continuing to perform a subset of the plurality of tasks.

19. A mobile communications device as described in claim 11, wherein the at least one potential configuration includes at least:

a first potential configuration that corresponds to the mobile communications device continuing to perform the plurality of tasks in additional to at least one other task, a second potential configuration that corresponds to the mobile communications device removing at least one task from the current configuration to continue to perform a subset of the plurality of tasks.

* * * * *